US008972787B2

(12) United States Patent
Mahesh et al.

(10) Patent No.: US 8,972,787 B2
(45) Date of Patent: Mar. 3, 2015

(54) DYNAMIC COLLECTION OF INSTRUMENTATION DATA

(75) Inventors: Sivarudrappa Mahesh, Redmond, WA (US); Kinshumann Kinshumann, Redmond, WA (US); Kripashankar Mohan, Redmond, WA (US); Shlok Bidasaria, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 209 days.

(21) Appl. No.: 12/415,950

(22) Filed: Mar. 31, 2009

(65) Prior Publication Data

US 2010/0251218 A1 Sep. 30, 2010

(51) Int. Cl.
*G06F 11/00* (2006.01)
*G06F 11/07* (2006.01)

(52) U.S. Cl.
CPC ........ *G06F 11/0766* (2013.01); *G06F 11/0748* (2013.01); *G06F 11/0706* (2013.01)
USPC .................................. 714/37; 714/31; 714/35

(58) Field of Classification Search
USPC .................................................. 717/130, 131
See application file for complete search history.

(56) References Cited

U.S. PATENT DOCUMENTS

| | | | | |
|---|---|---|---|---|
| 5,918,004 | A * | 6/1999 | Anderson et al. | 714/38.13 |
| 6,862,696 | B1 | 3/2005 | Voas | |
| 7,111,282 | B2 * | 9/2006 | Stephenson | 717/130 |
| 7,269,824 | B2 | 9/2007 | Noy | |
| 7,293,259 | B1 * | 11/2007 | Dmitriev | 717/130 |
| 7,415,712 | B2 | 8/2008 | Hunt | |
| 7,761,746 | B1 * | 7/2010 | Shafer et al. | 714/48 |
| 7,996,814 | B1 * | 8/2011 | Qureshi et al. | 717/120 |
| 2003/0115583 | A1 * | 6/2003 | Hundt et al. | 717/158 |
| 2004/0060043 | A1 * | 3/2004 | Frysinger et al. | 717/158 |
| 2005/0091635 | A1 * | 4/2005 | McCollum et al. | 717/101 |
| 2005/0091645 | A1 | 4/2005 | Chilimbi | |
| 2005/0091647 | A1 | 4/2005 | McCollum | |
| 2005/0155021 | A1 * | 7/2005 | DeWitt et al. | 717/130 |

(Continued)

OTHER PUBLICATIONS

Ha, J. et al., "Contemplating Navel: Improving Software Error Reporting by Classifying Program Behavior," Technical Report TR-06-11, Department of Computer Sciences, The University of Texas at Austin, http://www.cs.utexas.edu/ftp/pub/techreports/tr06-11.pdf, retrieved Feb. 2, 2009.

Janes, A. et al., "Using Non-Invasive Measurement Techniques in Agile Software Development: a Swot Analysis," http://www.unibz.it/web4archiv/objects/pdf/cs_library/aica2004cameraready.pdf, retrieved Feb. 2, 2009.

(Continued)

*Primary Examiner* — Michael Maskulinski
(74) *Attorney, Agent, or Firm* — John Jardine; Kate Drakos; Micky Minhas

(57) ABSTRACT

A flexible system for collecting and reporting instrumentation metrics relating to performance of a software product. Computing devices that execute the software product receive a manifest that specifies the manner in which instrumentation metrics are collected and reported, including what instrumentation metrics are collected. Based on the manifest, an instrumentation metrics client associated with a software product may retrieve instrumentation data from a software product or other sources. The metrics client may then generate one or more instrumentation metrics, based on the instrumentation data, in accordance with instructions in the manifest. The metrics client may then take one or more actions based on the instrumentation metrics and the manifest, such as reporting the information to an instrumentation metrics server for aggregation and analysis by the metrics server or performing escalation actions that can modify the metrics collected and reported.

20 Claims, 9 Drawing Sheets

(56) References Cited

U.S. PATENT DOCUMENTS

| | | | |
|---|---|---|---|
| 2005/0198649 A1* | 9/2005 | Zakonov | 719/318 |
| 2005/0223048 A1* | 10/2005 | Smith et al. | 707/205 |
| 2007/0180439 A1* | 8/2007 | Sundararajan et al. | 717/158 |
| 2007/0294660 A1* | 12/2007 | Chong et al. | 717/103 |
| 2008/0040341 A1* | 2/2008 | York et al. | 707/5 |
| 2008/0189687 A1* | 8/2008 | Levine et al. | 717/128 |
| 2008/0313507 A1* | 12/2008 | Mahmud et al. | 714/49 |
| 2009/0070867 A1* | 3/2009 | Akulavenkatavara et al. | 726/21 |
| 2009/0083714 A1* | 3/2009 | Kiciman et al. | 717/128 |
| 2009/0199160 A1* | 8/2009 | Vaitheeswaran et al. | 717/124 |
| 2010/0115495 A1* | 5/2010 | Sunkara et al. | 717/130 |
| 2010/0229157 A1* | 9/2010 | Ergan et al. | 717/128 |

OTHER PUBLICATIONS

Moser, R., "Applicability of Quantitative Techniques to the Analysis of Software Engineering Data Coming from Non-Invasive Measurements," University of Genoa, Italy, http://www.raimundmoser.com/papers/RaimundMoserDissertation.pdf, retrieved Feb. 2, 2009.

Sillitti, A. et al., "Collecting, Integrating and Analyzing Software Metrics and Personal Software Process Data," Proceedings of the 29th EUROMICRO Conference "New Waves in System Architecture" (EUROMICRO'03), 2003 http://ieeexplore.ieee.org/stamp/stamp.jsp?arnumber=1231611&isnumber=27589, retrieved Feb. 2, 2009.

* cited by examiner

DYNAMIC COLLECTION OF INSTRUMENTATION DATA

BACKGROUND

Software developers typically try to find and elimination sources of problems and failures of a software product during product testing that takes place as part of development of the software product. In some cases, testing of the software product may end there.

However, it is known to include error reporting services in computers to allow information on software problems to be collected. An example of such a service is the WINDOWS® Error Reporting Service provided by Microsoft Corporation of Redmond, Wash. When a failure, such as a crash or hang of an application occurs, the error reporting service may collect information about conditions on the computer leading up to the failure. This information, along with similar error reports from other computers executing the same application, may be sent to a central server, creating a database of failure that can be analyzed to identify software bugs that can be corrected.

Additionally, some software vendors may desire to refine and improve their software products continually, even if not in response to failures. Accordingly, it is also know to collect software quality metrics on the software product, while it is in use by customers. By collecting software quality metrics, it may be possible for software developers to identify ways a software product can be improved. For example, it may be advantageous to identify ways in which a software product is being used (e.g., frequency of use for specific features of the software product) or environments in which the software product is being used, and it may be advantageous to collect information on performance of the software product to optimize the software product for these uses or for execution in these environments.

Systems to collect software quality metrics are also known. As an example, the WINDOWS® operating system supports a software quality metric system that collects metrics relating to a software program from multiple different computers on which the software program executes. These metrics can relate to frequency and nature of use of software components, usability, reliability, and execution speeds of the software product. These metrics may be generated by the software program or may be calculated from raw instrumentation data output by a software product as it executes. Upon computation, the metrics may be transmitted to the central location for aggregation and analysis with metrics from other computing devices.

The metrics are collected and provided to the central location in accordance with instructions that are included in a released software product. For example, when a software product, or a new version of a software product, is released, the software product may include instrumentation metrics modules that are executed as a part of the software product. These metrics modules may include instructions, encoded as a part of the software product, that relate to collection of instrumentation data and computations on the instrumentation data to compute one or more metrics. When the software product is executed, the instructions of the metrics modules may be executed and may direct a computing device to collect specific instrumentation data, calculate instrumentation metrics based on that data, and provide the metrics to the central location.

As potential improvements are identified and made based on these metrics, and the software product is updated to a new version, the metrics modules and instructions may also be updated to direct the computing device to collect new and different instrumentation data and metrics to aid in identifying potential new sources of improvement.

SUMMARY

Applicants have recognized and appreciated that making of software improvements can be accelerated by modifying conventional approaches for collecting software quality metrics. Software development can be improved through a flexible software quality metric system that can be reconfigured from time to time to modify parameters associated with the reporting of metrics. In contrast to conventional techniques for collection of instrumentation data and calculation of instrumentation metrics are tied to the software products they monitor, a flexible system can allow different or additional metrics to be collected when one set of indicate a performance issue, but provide insufficient information to identify a cause of that issue.

Moreover, a flexible system can allow tradeoffs between the speed with which data is collected and the burden on individual computer users. Different computers executing the software program to collect different metrics. In this way, the processing burden on each computer can be relatively low. Yet, by aggregating data from multiple computers, the data collected can provide a statistically valid indication of use-related characteristics of the software program. Tradeoffs between speed and user burden can be made by setting the number of computers configured to collect and report metrics or the number metrics that are collected and reported by each computer. When more computers collect metrics or each computer collects more, statistically significant data can be collected more quickly, but with a greater risk of user disruption. Though, this risk can be ameliorated by a flexible system in that, once sufficient data is collected, computers can be reconfigured to reduce the amount of data provided by each computer.

Described herein are various principles for reporting instrumentation metrics using dynamic and adaptive techniques. Each user computer that is part of a software quality metric system may be provided with a manifest from time to time that specifies parameters of metric reporting. The manifest may specify which metrics to collect, sources of data for use in forming metrics, calculations to be performed on data or other suitable parameters associated with metric reporting.

Each client computer may receive a manifest, which may be different for each client computer and even may be different for the same client computer at different times. The content of each manifest may be selected in response to collected metrics. For example, in one implementation of these principles, a server may be provided to receive instrumentation metrics from one or more clients. The instrumentation metrics may be analyzed and processed in any suitable way, and a response presented to the client may include a new manifest that specifies a different manner in which instrumentation metrics are to be collected and/or reported. The client, upon receiving the manifest, may alter its collection, computation, and/or reporting of instrumentation metrics to correspond to instructions contained within the manifest. For example, the metrics client may collect or report instrumentation metrics more or less frequently, or may collect different instrumentation metrics, or may collect instrumentation metrics in a different manner.

In some cases, dynamic adaptation of metrics reporting is possible without downloading a new manifest. For example, a manifest may specify one or more escalations. Each escalation may include an indication of a condition under which one or more escalations actions is to be performed. The escalation actions may relate to changing a parameter associated with the collection or reporting of a metric. Alternatively or additionally, an escalation action may specify user output of other actions.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
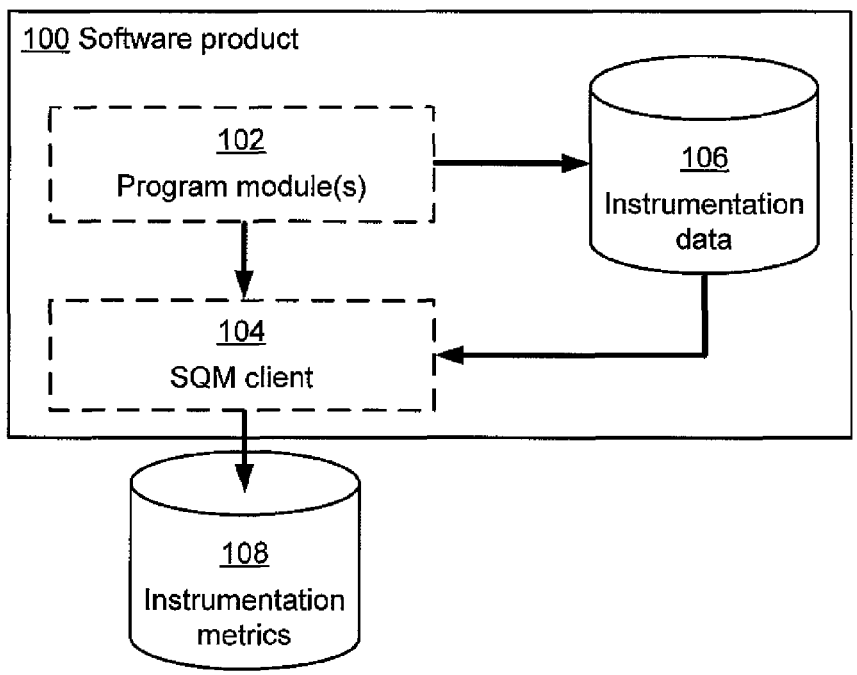
FIG. 1 is a block diagram of a conventional technique for collecting instrumentation metrics.

Applicants have recognized and appreciated that conventional mechanisms for collection of instrumentation metrics limit the effectiveness and speed of diagnosis of potential improvements for software products. For example, in some cases, instrumentation metrics that are collected from computing devices may indicate slow performance of a software product, but the instrumentation metrics may not provide sufficient information to allow a software developer to diagnose the reason for the slow performance and a corresponding way to improve it. As a specific example, metrics may indicate a performance issue, but may not allow a determination of whether the inefficiency is caused by coding of the software product or conditions of the environment in which that software product is executing (e.g., another software product that is interfering with execution of the software product). Accordingly, additional information about the environment, or additional information about the software product, may be needed to help diagnose the problem.

Using conventional techniques, however, the only way to obtain this additional information is by updating the software quality metrics (SQM) modules embedded in a software product to add instructions for collecting this information. Updating the software, and then deploying those updates to users, can be slow. Additionally, a software update does not provide flexibility to make tradeoffs between speed of data collection and user disruption.

Applicants have appreciated, therefore, that it would be advantageous to be able to alter a manner of collection of instrumentation metrics without updating the software modules that collect the instrumentation metrics.

Described herein are various techniques and principles for configuring collection and/or reporting of software quality metrics. Each computer participating in a software quality metric system may be configured with parameters relating to metrics to collect and/or report. These parameters may alter actions of a client component on the computer relating to which metrics are collected and/or reported, sources of data from which metrics are derived, the manner of use of data to compute a metric, the manner in which metrics are reported or the frequency with which metrics are reported.

These parameters may be provided to each client computer in a manifest that is provided to the client computer from a server or other suitable location. Each client computer may receive a different manifest and each client computer may receive different manifests from time to time. An instrumentation metrics client may use the manifest to determine the manner in which instrumentation metrics are collected, including what instrumentation metrics are collected.

For example, based on the manifest, an instrumentation metrics client associated with a software product may select one or more sources of data to be used in determining instrumentation metrics. The manifest can indicate data is to be obtained from any suitable source. Examples of sources of data include the software product and/or log files generated by the software product. Though, data may be obtained from an error reporting system that may be present to provide rich context data in response to a detected error or, in some embodiments, from a user of a computing device.

The manifest may also specify one or more processing steps to generate metrics from data. The metrics client, or example, may generate one or more instrumentation metrics, based on the instrumentation data, in accordance with instructions in the manifest. These instructions may be formatted in any suitable manner, including as declarative rules or descriptions that may be interpreted, rather than executable instructions.

The manifest may also specify actions to be taken using the obtained metrics. The metrics client may take one or more actions based on the instrumentation metrics and the manifest, such as reporting the information to an instrumentation metrics server for aggregation and analysis by the metrics server. In some cases, the manifest may specify one or more conditions that, when fulfilled by instrumentation metrics, cause the metrics client to "escalate." When the escalation conditions are detected, the instrumentation client may take one or more escalation actions, such as calculating more or different instrumentation metrics, triggering collection of richer instrumentation data, and/or querying a user for information.

When instrumentation metrics are reported to the metrics server by the metrics client, the metrics server may aggregate the metrics with other instrumentation metrics from other clients. Aggregated information may then be analyzed by the server and/or users of the server to determine whether the aggregated information indicates that any improvements may be made. If more information is necessary to identify potential improvements—for example, more or different instrumentation metrics—a new manifest may be created and distributed to clients to collect the new information.

As used herein, "instrumentation metrics" may refer to any information regarding execution of a software product, such as information that may be used to analyze performance the software product as it executes. In some cases, instrumentation metrics may relate to the software product itself, while in other cases instrumentation metrics may additionally or alternatively relate to an environment in which the software product is executing. For example, instrumentation metrics may include performance characteristics for a software product, such as statistical information about usability, reliability, or execution speeds of the software product, or information on usage of a software product such as whether, how, or how often certain functionality of the software product is used. Instrumentation metrics may also be environmental information, such as information on any other software products that may be executing in the environment, or identifying information for the environment such as an identifier for system hardware or an operating system.

Instrumentation metrics may be collected in any suitable manner. In some cases, an instrumentation metric may be generated based on information about a software product, such as instrumentation data output by a software product. Instrumentation data may be any suitable data generated by a software product during execution that indicates a status of the software product. For example, instrumentation data may indicate identify times at which a particular component of the software product is executed and a metric, representing frequency of use of this component, may be computed. Alternatively, the data may indicate the times at which a particular component began and ended execution and a metric may be computed representing time required to complete an operation.

Though, it is not necessary that instrumentation metrics be computed from instrumentation data. An instrumentation metric may itself be instrumentation data that is output by a software product. Additionally, instrumentation metrics may also be collected in other ways, such as by retrieving information about an environment of a software product from records maintained by the environment—for example, operating system records regarding a current state of the system, such as a listing of processes currently executing or hardware of the system. Accordingly, where instrumentation metrics are described below as being "collected," it should be understood that collection may involve retrieval or generation of instrumentation metrics, including performing a calculation or computation to generate the metrics.

In some embodiments of the invention described below, instrumentation metrics are described in the context of one exemplary instrumentation metrics system, the Software Quality Metrics (SQM) system available from the Microsoft Corporation of Redmond, Wash. It should be appreciated, however, that this is only one example of the types of instrumentation metrics systems with which embodiments of the invention may be implemented and that embodiments of the invention are not limited to operating with the SQM system. Rather, embodiments of the invention may operate in any suitable system that collects instrumentation metrics, included systems that include one or more clients collecting instrumentation metrics and systems that also include one or more servers to receive and analyze metrics from clients.

It should also be appreciated that, as used herein, a "software product" may be any suitable type or types of software, and may include any suitable set of computer-executable instructions implemented or formatted in any suitable manner. Software products may be implemented as application software. Though, techniques described herein are applicable to other types of software, such as system software (e.g., components of an operating system) and embodiments of the invention may collect instrumentation metrics on any suitable type of software product.

Described below are various techniques for collecting instrumentation metrics on a software product, and adjusting a manner in which instrumentation metrics are collected, according to a manifest. The manifest may be formatted and used to affect a manner in which instrumentation metrics are collected in any suitable way. As one example, the manifest may specify what instrumentation metrics are collected and/or how they are collected.

For comparison, FIG. 1 shows a block diagram of a software product 100 operating according to conventional techniques to obtain instrumentation metrics. The software product 100 may include one or more program module(s) 102 that carry out various tasks and functions associated with the software product and a SQM client 104 that collects instrumentation metrics based on the execution of the program modules 102. The SQM client 104 operates on data generated by program module 102. Here, the data is obtained from one or more log files generated by the program modules 102 in the form of a data store 106 of instrumentation data. The program modules 102 may be adapted to output information periodically to the data store 106 regarding the execution of the modules 102, such as when the modules 102 perform a specific function, such that execution of the modules 102 may be tracked. SQM client 104 may also be adapted to receive information from the program modules 102 directly, such as via specific Application Programming Interface (API) calls to the program modules 102. The SQM client 104, upon receiving data, performs computations to generate instrumentation metrics that are stored in a data store 108.

The SQM client 104, according to conventional techniques, is preprogrammed, when the software product 100 is being created, to receive certain data from the data store 106 and/or program modules 102, and perform predetermined computations to generate instrumentation metrics 108. Once the SQM client 104 is created and released with the software product 100, the SQM client 104 does not change the instrumentation metrics that are collected, nor does the SQM client 104 change the manner in which the instrumentation metrics are generated and the data on which the metrics are based. Rather, the manner in which instrumentation metrics are collected is changed by updating the software product 100.

Figure 2:
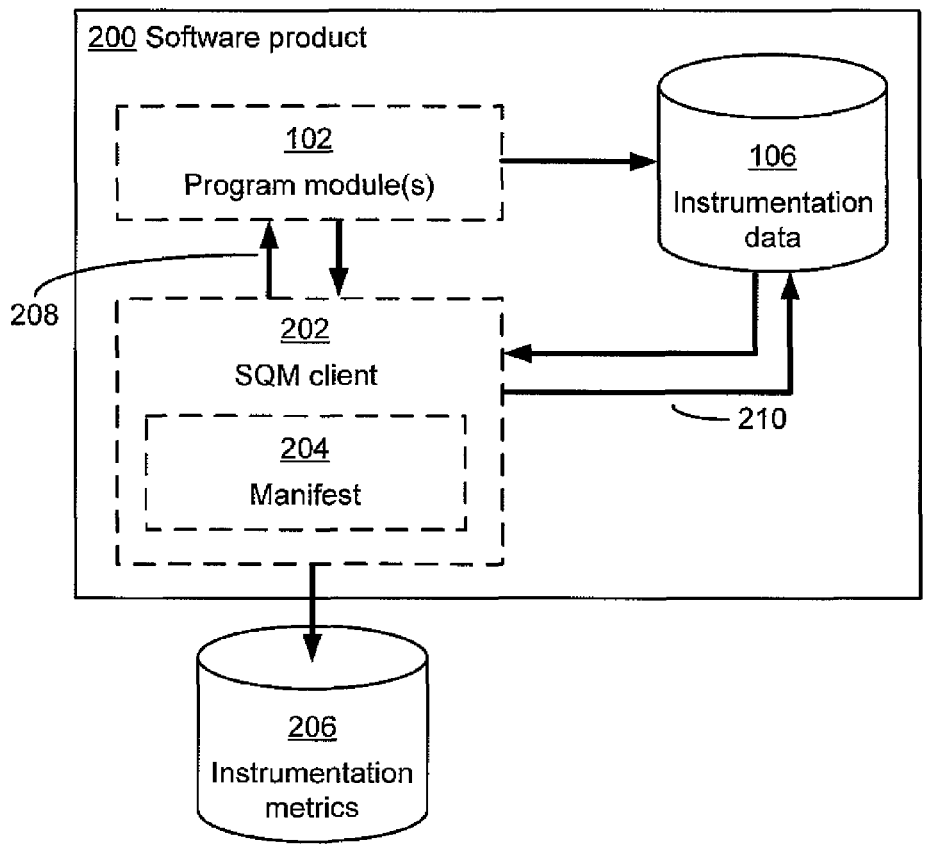
FIG. 2 is a block diagram on an illustrative software product with which some embodiments of the invention may operate.

In contrast, FIG. 2 shows a software product and technique for collecting instrumentation metrics in accordance with one embodiment of the invention. The software product 200 of FIG. 2 includes a SQM client 202 that may collect instrumentation metrics 206 in a particular manner as specified in a manifest 204. As in the example of FIG. 1, the software product 200 may include one or more program modules 102 to carry out tasks and functions relating to the software product 200. These program modules 102 also may be adapted to generate log files in the form of a data store 106 of instrumentation data.

SQM client facility 202 of FIG. 2 may be implemented as one or more components of software product 200. Even though software product 200 is not updated, the functions performed by SQM client 202 can be configured and reconfigured to collect instrumentation metrics based on the manifest 204. The manifest 204 may specify to the SQM client 202 instrumentation metrics to be collected and stored in the data store 206 of instrumentation metrics. The manifest 204 may additionally specify a manner in which the instrumentation metrics are to be collected; for example, by specifying the instrumentation data that is to be retrieved and used to generate instrumentation metrics and/or a manner in which the instrumentation metrics are to be generated based on the instrumentation data. For example, in some implementations, the manifest 204 may specify a particular computation to be carried out on particular instrumentation data to generate a particular instrumentation metric.

Based on the manifest 204, then, in some implementations the SQM client 202 may obtain particular data from the program modules 102 and data store 106. For example, based on the manifest 204, the SQM client 202 may make one or more API calls 208 to the program modules 102 to retrieve particular data from the program modules 102 regarding the execution of the program modules 102. The SQM client 202 may additionally or alternatively submit queries 210 to the data store 106 of instrumentation data, based on the manifest 204, to retrieve particular instrumentation data to be used in generating instrumentation metrics. The SQM client may retrieve information to be used as or in generating instrumentation metrics in any other suitable manner as well, such as by querying data stores outside of the software product 200 to retrieve information on, for example, the environment in which the software product 200 is executing.

Accordingly, in the embodiment of the invention illustrated in FIG. 2, a manifest 204 may be provided to a software product 200 and may be used by the SQM client 202 to direct the manner in which the SQM client 202 collects instrumentation data. In some cases, the manifest 204 may be used to change a manner in which the SQM client 202 collects instrumentation metrics. For example, a SQM client 202 may be collecting instrumentation metrics according to a first manifest 204 when it receives a second manifest 204. Upon receiving the second manifest 204, the SQM client 202 may change the manner in which it is collecting instrumentation metrics in accordance with the second manifest 204. For example, the SQM client 202 may change which instrumentation metrics are collected or may change how instrumentation metrics are collected, such as changing a computation used to generate a metric, based on the second manifest 202.

In the embodiment illustrated, when a manifest is updated, the functionality of the software product 200 is not being updated, which includes the functionality of the SQM client 202. Rather, the manner in which this functionality is being used is updated. For example, the SQM client 202 may be able to communicate with the program modules 102 via a set of API functions, and may be communicating by a first subset of them in accordance with the instructions of a first manifest. When a second manifest is received, the set of API functions will not change; rather, the subset of API functions that are used may be changed to a second subset in accordance with the instructions of the second manifest.

Figure 3:
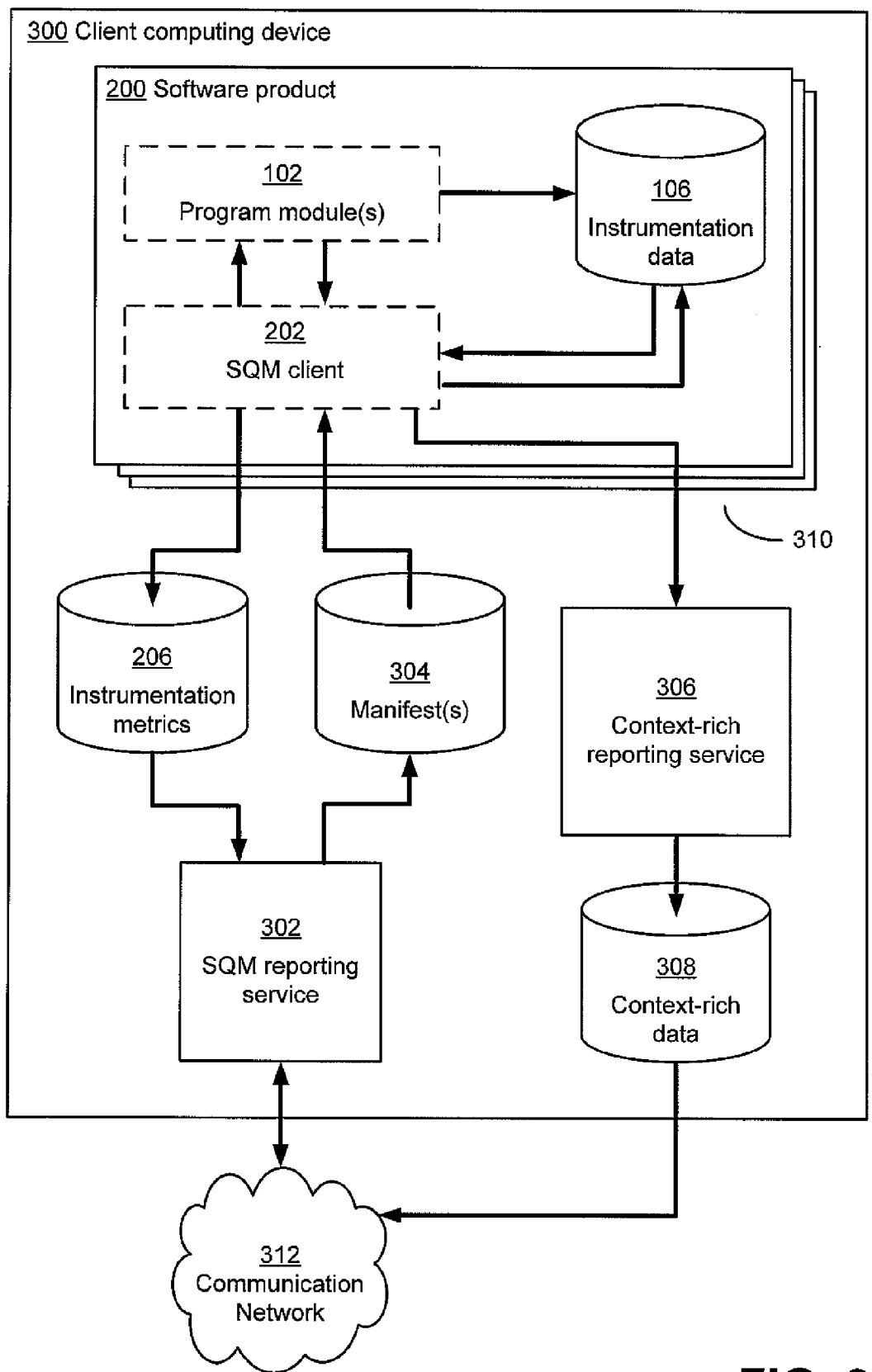
FIG. 3 is a block diagram on an illustrative computer system in which some techniques described herein may act.

The techniques described herein for collecting instrumentation metrics according to a manifest may be implemented in any suitable client computing device. A "client" computing device, as used herein, is any computing device that collects instrumentation metrics from a software product executing on the device. FIG. 3 shows one example of a computing device that may carry out some of the techniques described herein in one embodiment of the invention.

FIG. 3 shows a computing device 300 that includes a software product 200 as shown in FIG. 2. Software product 200 includes one or more program module(s) 102 carrying out tasks and functions related to the software product and that output data to a data store 106, which may be a log file or other suitable type of content. Software product 200 also includes a SQM client 202 that collects instrumentation data regarding the software product 100 according to the instructions of a manifest.

As shown in FIG. 3, computing device 300 may also include a SQM reporting service facility 302 that accepts the instrumentation metrics 204 collected by the SQM client 202 and transmits them outside of the computing device 300 for analysis (e.g., transmits them over a communication network 312). The SQM reporting service 302 may also accept from outside the communication device manifests to affect the operations of one or more SQM clients, including SQM client 202, and direct the manner in which those SQM clients collect instrumentation data. The SQM reporting service 302 may take any suitable action to make a new manifest available to a SQM client 202. For example, the SQM reporting service 302 may place the manifest in a memory location accessible to the SQM client 202, such as in a data store 304 of manifests on the client computing device 300, and notify the SQM client 202 through any suitable message-passing technique that a new manifest is available for its use.

In the embodiment illustrated in FIG. 2, manifest 204 is shown contained within the SQM client 202. This representation is shown for simplicity of illustration, though it should be appreciated that information in the manifest can be made available to SQM client 202 in any suitable way. As one example, information from the manifest could be stored in a registry of an operating system as information defining metrics or other parameters. Also, it is not necessary that the manifest 204 as used by SQM client 204 be in the same form as when it is obtained over a network. The manifest may be provided in a format other than the format in which it is used. It may, for example, be compressed, in which case it may be decompressed before use. As another example, the manifest may be encrypted and/or signed to ensure that a computing device is not configured, either unintentionally or maliciously, to report unintended data. Thus, one or more steps, not expressly illustrated in FIG. 2, may be performed to make the manifest available to SQM client 202.

Also, more than one manifest may be provided to a computing device. As shown in FIG. 3, computing device 300 may include a plurality 310 of software products similar to software product 200. Each software product of the plurality 310 may have a dedicated SQM client 202 collecting instrumentation metrics regarding the software product. These instrumentation metrics may each be stored in a data store 206 of instrumentation metrics to be transmitted outside the computing device 300 by the SQM reporting service 302.

As discussed above, manifests may be used in embodiments of the invention to affect the operations of a SQM client 202 in any suitable manner, and may affect a manner in which instrumentation metrics are collected. In some embodiments of the invention, a manifest may instruct the SQM client 202 to use outside resources to collect instrumentation metrics. For example, the manifest may instruct the SQM client 202 to request that other monitoring services available on the computing device 300 collect instrumentation metrics regarding the software product 200.

In the example of FIG. 3, one such other monitoring service that is available on the computing device 300 is a context-rich reporting service 306. Here, context rich error reporting service 306 may use techniques used by an error reporting service that provides information following a crash or hang or other error and, in some embodiments, may be such an error reporting service. The context-rich reporting service 306 is a service that collects information about a current state of a computer system that may provide context regarding components of the computer system. For example, context-rich information for a software product may include information about an environment in which the software product is executing, which includes information about the state of the computer system in which or computing device on which the software product is executing. This information may include information about other software products that are also executing on the system/device, as well as any other suitable information about the system/device such as identifying information regarding the hardware and/or software of the system/device.

In one example, context-rich information may include data from a memory dump carried out by a computing device that indicates a state of device memory at a particular time and may indicate the various processes executing on the device and the manner in which those processes are executing. Memory dump data may provide context for the analysis of a particular process or a software product associated with a process, such as the state of the process at the time the dump was carried out and the environment in which the process is executing. One example of a context-rich reporting service is the Windows Error Reporting (WER) service implemented in the Windows operating system from the Microsoft Corporation of Redmond, Wash.

In some embodiments of the invention, a manifest may indicate to a SQM client 202 that the manner in which the SQM client 202 should collect instrumentation metrics includes collecting context-rich information as one or more instrumentation metrics. In such a case, the SQM client, if a context-rich reporting service like service 306 is available on the computing device 300, may leverage the functionality of the existing service 306 to collect this context-rich data. The SQM client 202 may therefore instruct the context-rich reporting service 306 to collect the context-rich data 308. The context-rich reporting service 306 may then provide the context-rich data 308 that is made available in any suitable way for use in reporting software quality metrics. For example, that data may be provided to the SQM client 202 or SQM reporting service 302, or may, in some implementations, transmit the context-rich data 308 in its usual manner to a recipient outside of the computing device 300 (e.g., by transmitting it via the communication network 312).

If there is no context-rich reporting service available on the computing device 300, however, it should be appreciated that the SQM client 202 may, in such cases, collect context-rich instrumentation metrics itself.

Figure 4:
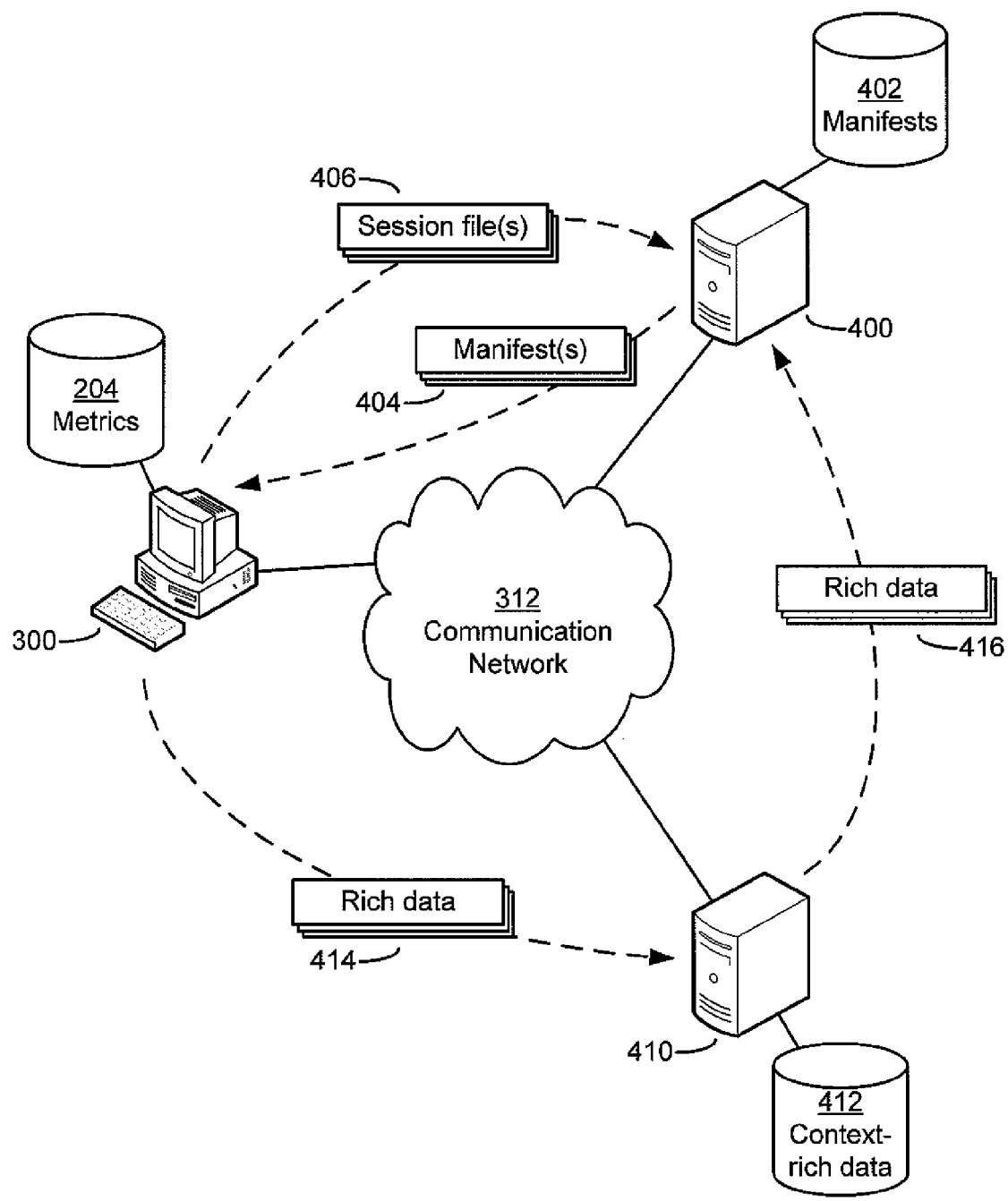
FIG. 4 is an illustration of an exemplary computer system in which some techniques described herein may act.

FIG. 3 shows one exemplary computing device 300 that may be used to carry out techniques described herein for collecting instrumentation metrics. The computing device 300 may operate in any suitable computer system, including any other suitable number and types of computing devices. FIG. 4 shows one illustrative computer system, but it should be appreciated that others are possible.

FIG. 4 shows the computing device 300 on which is executed a software program for which software quality metrics are to be collected. Computing device 300, and its data store 204 of instrumentation metrics generated by one or more SQM clients 202, is attached to a communication network 312. Communication network 312 may include any suitable wired and/or wireless communication medium or media for exchanging data between two or more computing devices. Communication network 312 may be a private network (e.g., a corporate enterprise network), a public network, or any suitable combination of public and private networks, including the Internet.

Also connected to the communication network 312 is a server 400. The server 400 may include a data store 402 of manifests. These manifests may provide information about reporting metrics for a single software product, with different manifests provided to different computing devices. Though, server 400 may store manifests for multiple software products.

One or more of these manifests 402 may be transmitted to the client computing device 300, via the network 312, as manifests 404 and may affect the operations of one or more SQM clients 202 on the computing device 300. Specifically, the manifests 404 may direct the manner in which the SQM clients 202 collect instrumentation metrics, such as by affecting what instrumentation metrics are collected and/or how the instrumentation metrics are collected. The manifests may also specify escalation conditions and escalation actions. The manifests 402/404 may be formatted in any suitable manner. In some embodiments of the invention, they may be implemented as Extensible Markup Language (XML) files, including as compiled, binary versions of XML files.

Once the one or more SQM clients on the computing device 300 have collected instrumentation metrics according to the manifests 404, the instrumentation metrics may be transmitted to the server 400—for example, by the SQM reporting service 302 of computing device 300—in the form of one or more session files 406. The session files may include some or all of the instrumentation metrics identified in the manifest 404. For example, in some cases a software product may not execute all its operations during a particular execution session of the software product (e.g., may not execute some functionality), and as a result may not output some instrumentation data that would be used to generate an instrumentation metric. Accordingly, a session file 406 may include only those instrumentation metrics that were collected during a particular execution session for a software product.

When the session files 406 are received by the server 400, they may be analyzed in any suitable manner, such as automatically by one or more processes executing on the server 400 and/or by one or more users of the server 400. In some embodiments of the invention, in response to analyzing the session files 406, either individually or with other session files received from the computing device 300 and/or from other client computing devices, a new manifest may be generated that directs a SQM client 202 to collect instrumentation metrics in a new manner, such as by collecting different instrumentation metrics or more instrumentation metrics. The content of each manifest may be determined in any suitable manner, such as by identifying metrics that will aid in diagnosing a source of inefficiency in a software product or any other way in which a software product may be improved. A manifest identified in this manner may then be provided as a manifest 404 to the computing device 300, and the cycle may repeat.

Transfer of manifests and session files between the client computing device 300 and the server 400 may be carried out in any suitable manner according to any suitable protocol. In some embodiments of the invention, the transfer may be carried out using the Hypertext Transfer Protocol (HTTP), which may or may not be secured.

As discussed above in connection with FIG. 3, in some implementations a manifest may direct a SQM client to collect context-rich instrumentation metrics, and in some such cases context-rich data may be collected by a context-rich reporting service and transmitted in its usual manner to a designated recipient. Some context-rich reporting services may have a designated recipient that is a server for receiving and/or analyzing context-rich data. In embodiments in which context-rich data is provided to a separate server, it may be aggregated with other metrics in any suitable way. The aggregation may involve associating specific context-rich data generated at a particular time by a computing device with metrics collected at the same time by the same computing device. Though, in some instances, in which a statistical profile of performance of a software product is created, it may be possible to aggregate context-rich data with SQM data without specifically identifying the computer that generated either or both types of data.

FIG. 4 shows one example of the way in which context-rich data can be aggregated with SQM data. As illustrated, server 410 maintains a data store 412 of context-rich data. As shown in FIG. 4, the computing device 300 (e.g., context-rich reporting service 306) may transmit to the server 410, via the network 312, context-rich data 414 that was collected. The server 410 may then perform any suitable function on the rich data 414, and may provide the context-rich data 416 to the server 400 for analysis along with the other instrumentation metrics collected by the computing device 300. This providing may be done, as shown in FIG. 4, by transmitting the rich data to the server 400 via the network 312, though it may be provided in any other suitable manner as well.

Various computing devices and computer systems have been discussed above that may be used in some embodiments of the invention to implement techniques for collecting instrumentation metrics according to a manifest. It should be appreciated that these devices and systems are merely illustrative, and that embodiments of the invention are not limited to operating with any particular type(s) of devices or systems.

For example, in the exemplary systems described above the SQM client is shown as a portion of the software product that it is monitoring. In alternative embodiments of the invention, the SQM client may be outside of the software product and may be, for example, a portion of an operating system of the computing device. In some such implementations, the SQM client may incorporate the functionality described above in connection with the SQM client and with the SQM reporting service, such that there would not be two separate functional facilities, but this distinction may still be preserved in some embodiments of the invention implementing a SQM client outside a software product. Also, in the embodiment illustrated, there is one SQM client for each software product to be monitored. A one-to-one relationship is not required. One SQM client may collect metrics for more than one software product or, conversely, a software product may have more than one SQM client.

Further, it should be appreciated that the principles described herein for collecting instrumentation data can be implemented as any suitable technique or set of techniques. Described below are several examples of techniques that may be used to carry out these principles in some embodiments of the invention, but it should be appreciated that embodiments of the invention are not limited to implementing these illustrative techniques.

Figure 5:
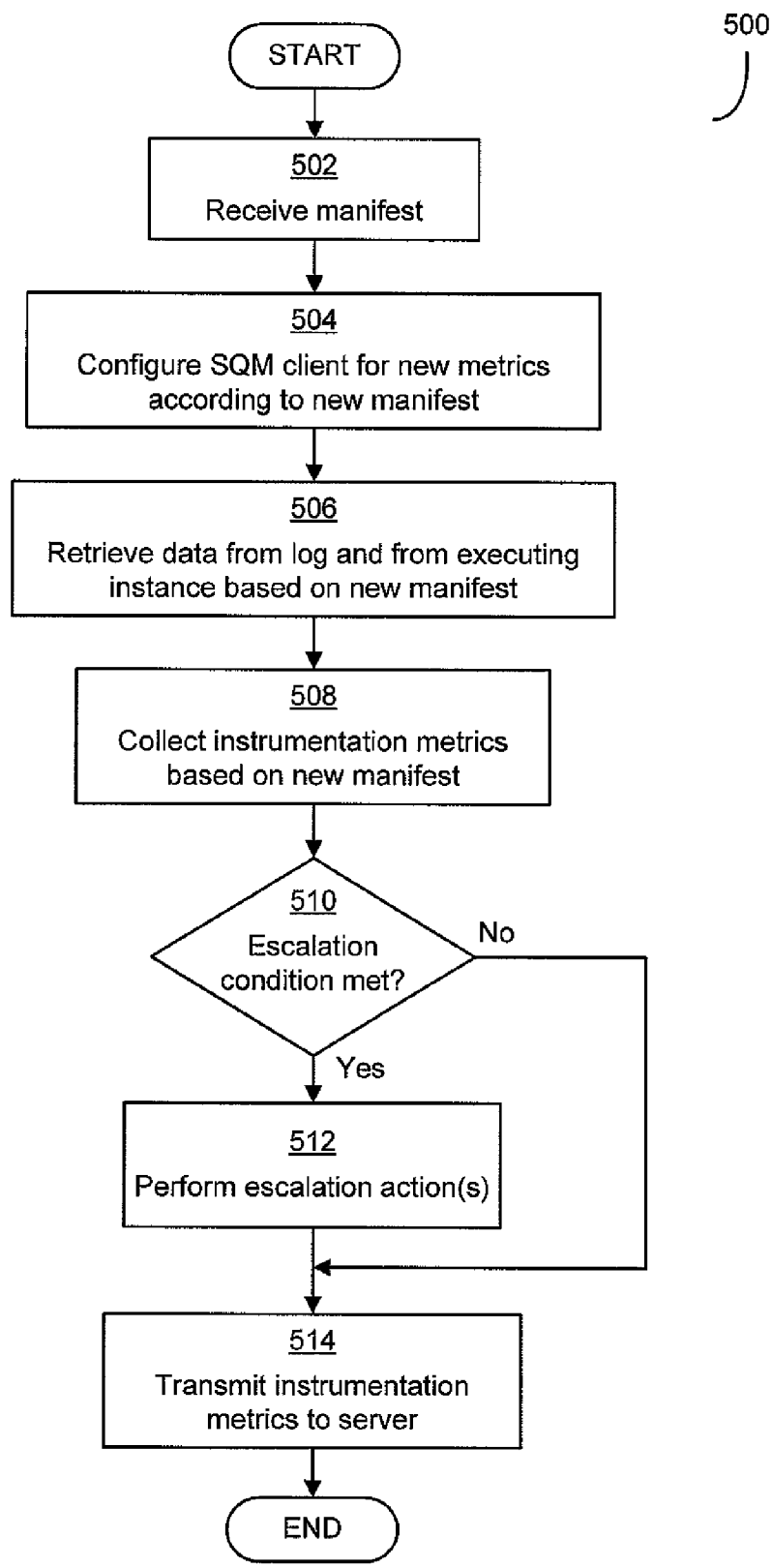
FIG. 5 is a flowchart of an illustrative technique for collecting instrumentation data.

FIG. 5 shows one exemplary process 500 for collecting instrumentation metrics. Process 500 begins in block 502, in which a manifest is received that includes instructions describing a manner in which instrumentation metrics are to be collected. For example, the instructions may describe what instrumentation metrics are to be collected, or how instrumentation metrics are to be collected.

In block 504, a SQM client (which may be implemented as a "facility" as described below) and/or a SQM reporting service (which also may be implemented as a "facility") are configured according to the instructions of the manifest to collect instrumentation metrics in the specified manner. The configuration may affect any parameters of the collecting or reporting of metrics, and may be carried out in any suitable manner to affect operations of the SQM client or reporting service.

In some embodiments of the invention, the SQM client may be adapted to review operations of the software product (e.g., of the program modules of the software product) as those operations are being carried out. For example, the SQM client may receive information in response to function calls it makes through an API of the software product or may review information in log files as the log files are generated or populated. As this information is made available to the SQM client, the SQM client may automatically review the information to see if the information meets the conditions of one or more rules specified in the manifest. For example, if the information specifies that some operation was carried out, or was carried out in some particular manner (e.g., took longer than some threshold time to execute or generated an error during execution), then the data may be retrieved by the SQM client and used as or in generating at least one instrumentation metric. For example, in one embodiment, a manifest may include one or more sets of information that specify a type of data and a value for that data (a "key-value pair"). Each key-value pair may be compared to information produced by a software product (e.g., information retrieved via an API or output to a log file) to determine whether the information matches the type specified in the pair and whether the value for the information is at, above, or below the value specified in the pair. Depending on the manifest, the SQM client may then take one or more actions depending on these conditions.

Accordingly, in such embodiments of the invention that evaluate information output by the software product, configuring a SQM client according to a manifest may comprise causing these rules to be used when evaluating the information. For example, the configuration may comprise providing the rules to an evaluation facility of the SQM client for use during execution of the evaluation facility.

Another example of the type of configuration that may take place in block 504 is used with escalation conditions. As discussed in greater detail below, in some cases a manifest may specify one or more conditions for data that is analyzed and/or metrics that are collected that, when satisfied, change the manner in which metrics are collected to an "escalated" state. For example, if an instrumentation metric indicates that something may be wrong in the environment because the software product took an inordinately long time to execute, the manifest may instruct that context-rich data should be collected to identify, or aid in identifying, the source of the problem in the environment (e.g., identify which other process executing on a device is causing problems with the software product). These conditions may also be provided to any suitable component of the SQM client for evaluation during the retrieval of instrumentation data and/or collection of instrumentation metrics.

As another example, the manifest may instruct the SQM client to issue specific API function calls to the program modules of a software product to request specific configuration information and/or configure the program modules to output specific instrumentation data to a log file. The configuration may additionally or alternatively specify certain actions that are to be taken by the SQM client in retrieving information for use in collecting instrumentation metrics, such as by periodically retrieving information via API function calls and/or by periodically querying the log files or other data stores generated by the program modules of the software product.

The manifest may also specify timing information relating to the collection or reporting of metrics. The manifest may specify a frequency at which to retrieve data for generating metrics. The SQM client may be configured to perform actions periodically, in accordance with a timing specified in the manifest, in any suitable manner, such as by generating scripts or other sets of computer-executable instructions to perform actions or by altering existing scripts that may have been configured according to a previous manifest.

Configuration at block 504 may additionally or alternatively include configuring how instrumentation metrics are to be generated. For example, a manifest may specify instrumentation data that is to be retrieved over time as the basis for one or more instrumentation metrics, as well as a time period over which to retrieve the data before computing the metric(s). In other words, the manifest may specify a frequency with which instrumentation metrics are collected.

Further, in some cases the configuration may take the form of configuring a manner in which instrumentation metrics are stored and/or transmitted from a computing device. For example, a manifest may specify a frequency with which instrumentation metrics are to be reported to a server, such as server 400 of FIG. 4. This reporting frequency may be related, in some embodiments, to a frequency with which instrumentation metrics are collected, but in other embodiments may not be related and may instead be used to consolidate reporting actions such that, for example, all metrics collected by a SQM client are reported by the reporting service once per day.

However the operations of the SQM client and/or SQM reporting service are configured according to the manifest, once configuration is complete the process 500 may continue in block 506 by retrieving instrumentation data. Any suitable instrumentation data may be retrieved, and the retrieving of instrumentation data may be done in any suitable manner, as embodiments of the invention are not limited in this respect. In some implementations, the retrieval may be performed in accordance with the manifest and with the configuration of block 504, such as where the manifest specifies data and/or a manner of retrieval. In other cases, however, a manifest may not specify data, a manner of retrieval, or both, and a SQM client may instead retrieve data in a predetermined manner.

In one embodiment of the invention, the SQM client may retrieve information from an executing instance of the software product via one or more API calls, or may evaluate information that is stored in one or more log files populated by the software product. As discussed above, data may be retrieved from outside the software product in some implementations, such as where environment data and/or context-rich data is retrieved for use in collecting instrumentation metrics. In some cases, retrieval may be carried out in an active manner, with a positive act of requesting data or seeking out data, while in other cases retrieval may be carried out in a passive manner in which data is provided to the SQM client for analysis or the SQM client observes data that is being used by part of the software product.

Typically, instrumentation data that will be retrieved from a software product or from an environment in which the product is executing will not be the type of information that may be used to identify a user or habits of a user. In other words, no personally-identifiable information will typically be retrieved. However, in cases where information is retrieved that presents a risk to a user's privacy or security, the user may be prompted to determine whether the user would like to participate in collecting instrumentation metrics. In some such cases, the potentially-risky information may be displayed to the user, and the user may be permitted to decide whether to release some or all of the information or whether to withhold some of the information from use in collection of instrumentation metrics. This may be important in some embodiments of the invention to ensure that while a software product is being tested, upgraded, and improved, users of the software product are not harmed nor is any of their personal information compromised.

In block 508, instrumentation metrics may be collected based on the manifest received in block 502. Instrumentation metrics may be collected in any suitable manner, as embodiments of the invention are not limited in this respect. The manifest may direct the collection of instrumentation metrics, such as by indicating what metrics are to be collected and/or how to collect those metrics.

As discussed above, instrumentation metrics may be based on retrieved data and may, in some embodiments, be generated from retrieved data. For example, in some cases, collecting instrumentation metrics may involve analyzing and/or performing one or more computations or calculations on the instrumentation data retrieved in block 506. For such instrumentation metrics, the computation that is to be performed to generate the metric may be specified by the manifest. This computation may be built into the functionality of the SQM client and referenced by the manifest, may be contained in the manifest itself (e.g., an equation or process may be described in the manifest), or may be specified in any other suitable manner. The manifest may also, in cases where a metric is based on a computation involving instrumentation data, specify what data is to be used in the computation. Regardless, where the manifest indicates that an instrumentation metric is to be generated, it may be generated in block 508 based on the instructions of the manifest.

In other cases, metrics may not be generated. Instead, instrumentation data retrieved in block 506 may be used as an instrumentation metric, such as where the data itself is a metric or an aggregated set of the data is a metric. Any suitable information, retrieved or generated in any suitable manner, may be used as an instrumentation metric.

As discussed above, some embodiments of the invention may support the ability for a manifest to specify rules and conditions surrounding an "escalation." Upon detection of an escalation condition, an SQM client may initiate one or more escalation actions. Escalation actions may modify a parameter of collecting or reporting metrics. For example, escalation actions may include collecting more or different instrumentation metrics, based on fulfillment of one or more conditions. For example, if a collected instrumentation metric is far above a particular threshold that is a condition for escalation—indicating that something may be very wrong with the software product or the environment in which it is executing—the manifest may instruct the SQM client to collect more or different instrumentation metrics to aid in diagnosis of the source of the problem.

An escalation condition may be specified by the manifest in any suitable manner. For example, a condition may be a threshold value for a type of instrumentation data or for an instrumentation metric. In some such cases, escalation may be based on a comparison to the threshold. This comparison may include whether the data/metric dropped below, met, or exceeded the threshold, or any other suitable comparison. Though, it should be appreciated that a threshold is only one example of a condition, and that any suitable condition may be used. Further, an escalation may be based on any suitable combination of one, two, or more conditions.

In block 510, the process 500 determines whether, based on the instrumentation data retrieved in block 506 and the instrumentation metrics collected in block 508, one or more escalation conditions are met. If not, then the process 500 continues to block 514 discussed below.

If, however, one or more conditions are met, then in block 512 one or more escalation actions may be taken. Escalation actions may include collecting escalation information. Escalation information may be any suitable information, including instrumentation data and/or instrumentation metrics. Collection of escalation information may be carried out in any suitable manner, including according to any of the techniques described above for retrieving instrumentation data and instrumentation metrics. In some cases, collection of escalation information may include retrieving instrumentation data and generating instrumentation metrics according to escalation instructions contained in the manifest. Further, in some embodiments of the invention, collection of escalation information may include collecting context-rich information, which may be carried out by a SQM client or by a context-rich reporting service as discussed above in connection with FIG. 3. When context-rich information is collected by such a reporting service, it may be provided to the SQM client or may be provided to another destination, such as a context-rich reporting server, before being analyzed alongside instrumentation metrics and other information collected by a SQM client.

Collecting escalation information can increase the rate at which information to diagnose a potential problem is collected while not creating a significant risk of degrading a user's experience with a software product, it should be appreciated that collecting escalation information is not the only possible escalation action. Escalation actions may include notifying a user, obtaining information from a user or other sources or changing the manner or frequency of reporting of software quality metrics.

Following the escalation action in block 512, then process 500 continues to block 514, in which instrumentation metrics are transmitted to a remote recipient, such as a server, for analysis. The instrumentation metrics may be transmitted in any suitable manner, and may be transmitted in the form they were collected by the SQM client in block 508 (and/or block 512) or in any other suitable manner. For example, a reporting service may receive the instrumentation metrics and perform actions such as analysis, aggregation, or packaging, or any other suitable action, prior to transmission, and may transmit the output of these actions. In some embodiments of the invention, the manner in which instrumentation metrics are transmitted may be directed by the manifest. For example, the manifest may specify some analysis process to carry out on the metrics, or may specify that the metrics are to be transmitted according to some time schedule. In some implementations, the manifest may specify the destination to which the metrics are to be transmitted, such as specifying which server is to receive the metrics. In other embodiments, however, the manner of transmission may not be affected by the manifest, and may be carried out in a predetermined manner.

Once the instrumentation metrics are transmitted in block 514, the process 500 ends. Though, it should be appreciated that FIG. 5 illustrates one iteration of a process that may be repeated multiple times, continuously, at timed intervals or at times determined in any suitable way. It should also be appreciated that not all blocks of FIG. 5 need to be repeated for each iteration. For example, the processing of blocks 502 and 504 may be repeated less frequently than the other processing blocks shown in FIG. 5. Conversely, if a manifest is received that specifies no monitoring is to be performed, blocks 502 and 504 may be performed more frequently than the other processing blocks shown in FIG. 5.

It should be appreciated that the principles described herein for collecting instrumentation metrics according to a manifest may be carried out in any suitable manner, and that embodiments of the invention are not limited to implementing these principles according to any specific technique(s).

Accordingly, it should be appreciated that the process 500 of FIG. 5 is only illustrative of the types of techniques that may be implemented in embodiments of the invention, and that others are possible. Some embodiments of the invention may perform more or fewer acts, such as not evaluating escalation conditions or collecting escalation information.

Figure 6:
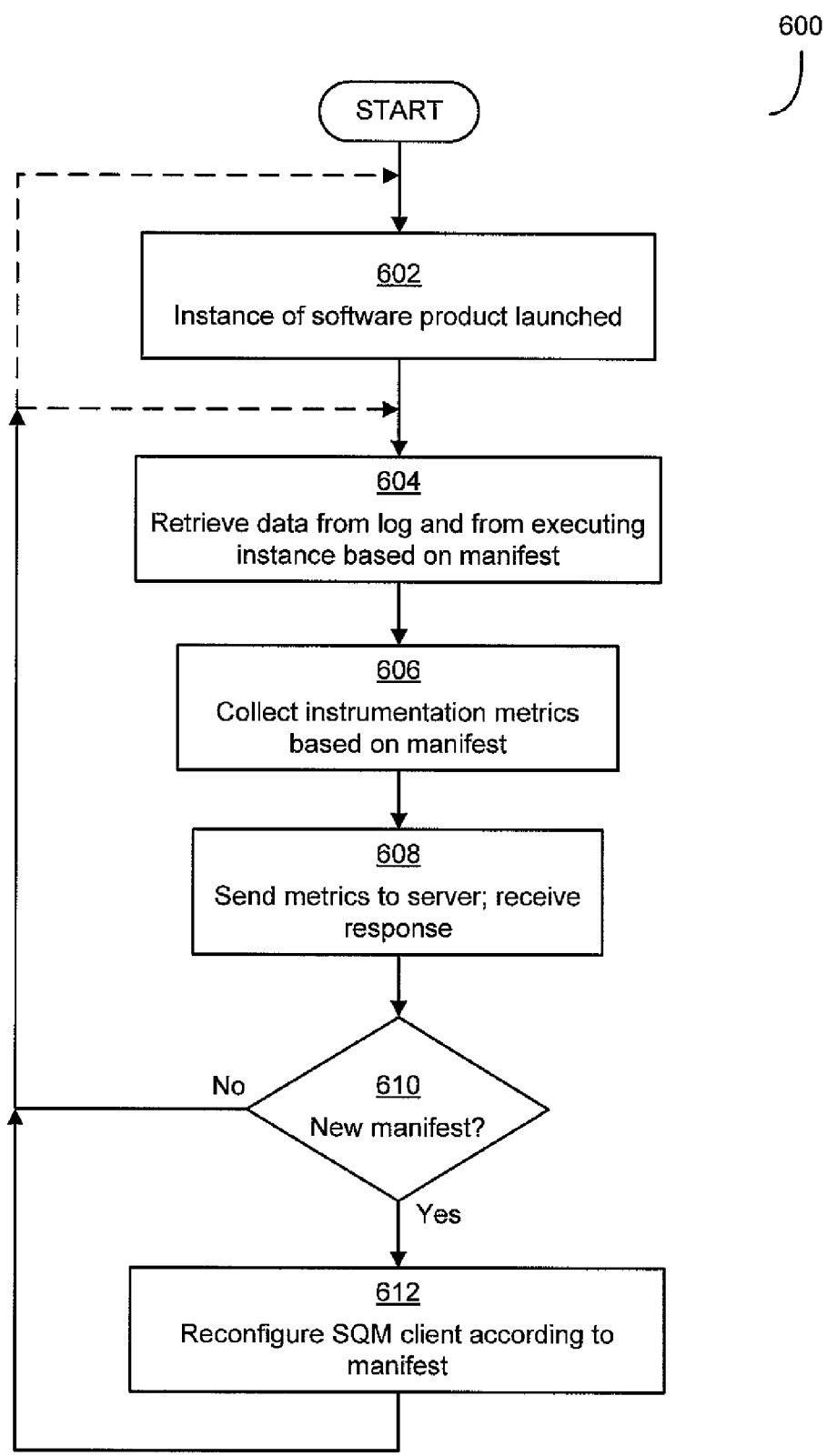
FIG. 6 is a flowchart of another illustrative technique for collecting instrumentation data.

FIG. 6 shows another illustrative process that may be implemented in embodiments of the invention for carrying out collection of instrumentation metrics according to a manifest. As discussed above in connection with FIG. 4, in some embodiments of the invention collection and reporting of metrics according to a manifest may be performed in a somewhat cyclical manner, such that as metrics are collected and reported new manifests are received over time, sometimes in response to metrics that have been reported, and a collection process may loop through collection, adapting to new manifests as they are received. Such a loop is shown in the exemplary process 600 of FIG. 6.

In block 602, an instance of a software product to be monitored may be launched (i.e., executed), which may be a trigger that starts retrieval of instrumentation data and collection of instrumentation metrics by a SQM client of the software product. In block 604, the retrieval of instrumentation data according to a first manifest is carried out in any suitable manner, including according to some of the exemplary techniques described above—for example, retrieving data via one or more API function calls or reviewing contents of one or more log files. In block 606, instrumentation metrics may be collected according to the first manifest; again, this may be carried out according to any of the exemplary techniques described above, or any other suitable technique. The instrumentation metrics collected in block 606 may then be transmitted in block 608 to a remote recipient, such as a server, and a response to those metrics may be received.

The response from the remote recipient may be in any suitable format and may include any suitable information. In some cases, the response may be an acknowledgement that the instrumentation metrics were received. In other cases, however, the response may include one or more instructions that may affect the operations of a SQM client or any other facility. In some cases, these instructions may include a new manifest to direct the manner in which instrumentation metrics are to be collected.

In block 610, then, it is determined whether the response includes or identifies a new manifest to be used. If not, then the process 600 may loop back to one of blocks 602 and 604, depending on when or how the metrics were transmitted in block 608—if the metrics were transmitted when the instance of the software product finished executing and was shut down, then the process 600 may return to block 602 such that the first manifest may be used again to collect instrumentation metrics the next time an instance of the software product is launched in block 602. If, however, the software product was still executing when the instrumentation metrics were transmitted in block 608, then process 600 may return to block 604 and continue retrieving instrumentation data in block 604, collecting instrumentation metrics in block 606, and transmitting the metrics in block 608 according to the first manifest.

If, however, it is determined in block 610 that the response of block 608 did include/identify a new manifest, then in block 612 the SQM client (and/or SQM reporting service) are configured according to the new manifest. This configuration may be carried out in any suitable manner, examples of which are discussed above. Once the reconfiguration is complete, then the process 600 returns to one of block 602 and 604, based on when/how the metrics were transmitted in block 608, as discussed above.

Thus, in some embodiments of the invention, the process 600 may loop through itself, collecting instrumentation metrics according to successive manifests and transmitting them to a remote recipient. It should be appreciated, however, that process 600 is only illustrative of the operations of some embodiments of the invention, and that not all embodiments of the invention may operate in the manner shown in FIG. 6.

As mentioned above, some embodiments of the invention may include a server that receives instrumentation metrics from one or more clients and performs analysis on those metrics. It should be appreciated that not all embodiments of the invention will include a server, and that those that do may implement any suitable server to perform any suitable analysis on the instrumentation metrics.

Figure 7:
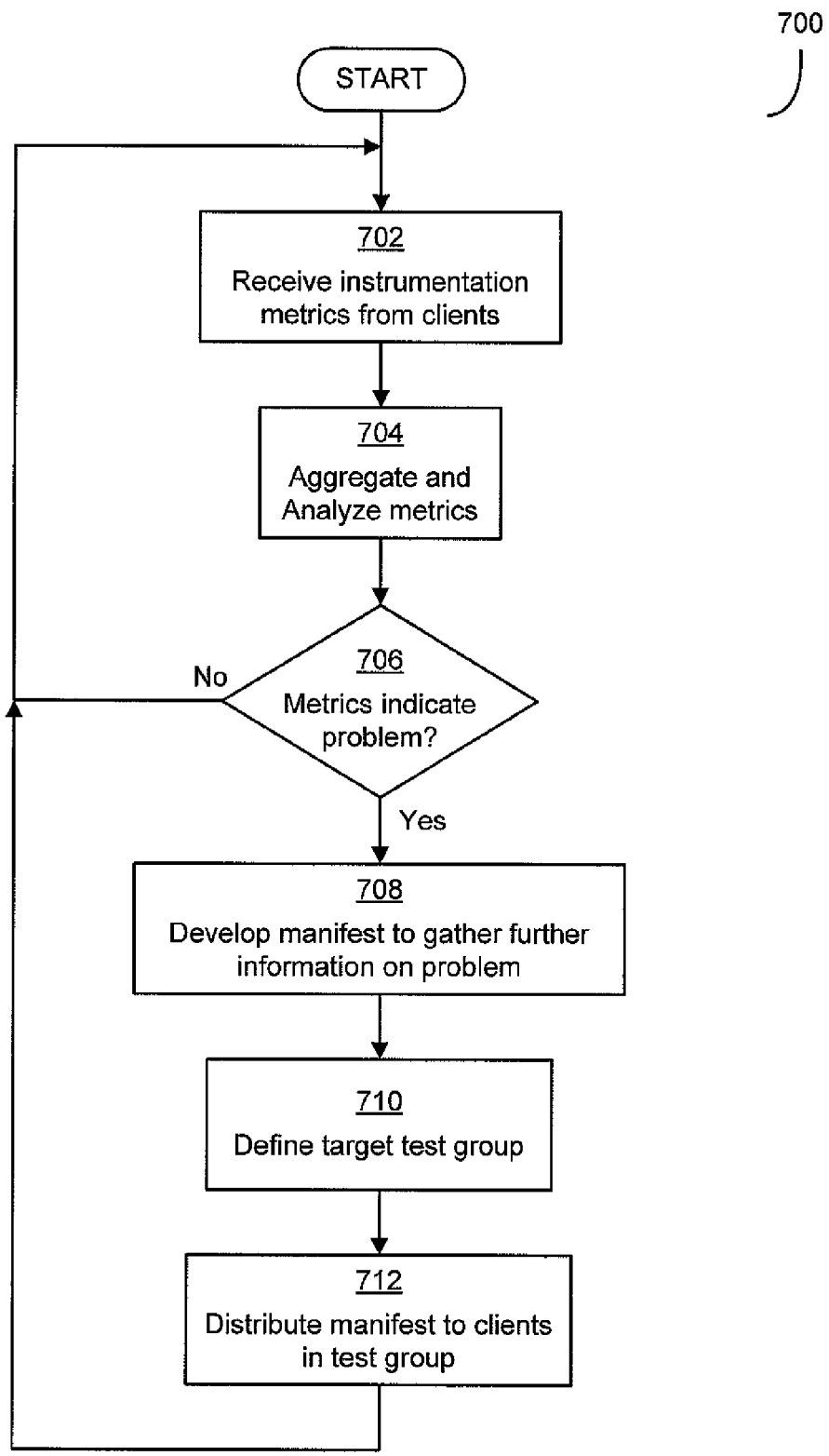
FIG. 7 is a flowchart of one exemplary technique for analyzing instrumentation data and releasing new manifests from a server.

FIG. 7 shows an illustrative process 700 that may be implemented by a server in some embodiments of the invention. Process 700 begins in block 702, in which the server receives instrumentation metrics from one or more client computing devices. In block 704, these metrics may be analyzed in any suitable manner and may be automated by one or more software processes and/or performed manually by one or more users.

In some cases metrics from particular clients may be analyzed individually to determine whether there is any indication of a potential source of improvement on the particular client, while in other case metrics from clients may be aggregated with metrics from other, similar clients (e.g., metrics that were collected in similar environments) and analyzed together. Metrics may be examined and inspected in any suitable manner to identify potential areas of improvement for a software product, including looking for extreme metrics—for example, metrics outside a common range—or inconsistencies in metrics between environments. This analysis may yield information that can be used to improve a software product such that it functions better in more environments or may lead to an identification of different or additional metrics for which data collection is desired.

In block 706, based on this analysis, it is determined whether the metrics indicate the presence of a problem or a potential improvement. If not, then the process 700 loops back to block 702 wherein more metrics are resolved.

As discussed above, in some cases, potential improvements cannot be easily identified from the available metrics and more instrumentation metrics may need to be collected in a different manner. For example, more or different metrics may need to be collected, or different data may need to be evaluated in generating metrics, or any other suitable change may need to be made. In accordance with the principles described herein, then, in these cases a new manifest may be devised that instructs a SQM client to collect instrumentation metrics in a manner that fulfills these needs (e.g., by collecting different metrics).

Accordingly, if it is determined in block 706 that the metrics received do indicate a problem or a potential improvement, then in block 708 a new manifest may be developed to gather more or different information. This manifest may be determined in any suitable manner, including based on automated or human analysis of aggregated metrics. The manifests may include any suitable content directing that instrumentation metrics be collected in any suitable manner.

In block 710, once the manifest is determined, a target test group for the manifest may be defined. The target test group defines a group that will receive the manifest and collect instrumentation metrics in accordance with the manifest. In some cases, the target test group may be every client computing device that executes the software product, while in other cases the target test group may be smaller. For example, the metrics may indicate a potential problem when the software product is used in a particular environment, and the new manifest may be limited to use by computing devices in that environment; accordingly, the target test group would be computing devices that offer or are in that environment.

Further, in some cases a target test group for a manifest may only be a portion of an environment or a portion of an overall test group. This may be done to limit the amount of processing that is done on a SQM client to collect instrumentation metrics, to ensure that impact on a user experience is limited. For example, each time a SQM client carries out some operation for collecting instrumentation metrics, it takes away processing resources from user applications and user programs; if the SQM client is performing many operations, then the user may be more significantly or noticeably impacted. In some cases this is not desirable, so the server may act to avoid this by, once a set of instrumentation metrics to be collected are determined, splitting this set into two or more groups and assigning some of the metrics to one test group and some of the metrics to another test group.

Once a target test group is determined in block 710, then the manifest may be distributed to computing devices of that test group in block 712. This may be done in any suitable manner. For example, the server may maintain a listing of computers that are executing the software product, and may transmit the manifest to computers in the test group based on information in the listing. As an alternative, in some embodiments of the invention a computing device, when transmitting instrumentation metrics, may transmit with the metrics identifying information describing the computing device and/or the environment in which the software product is operating. The server may use this information to identify which computing devices are to receive the manifest, and may transmit the manifest to a computing device unsolicited, in response to instrumentation metrics transmitted by the computing device, or in any other suitable manner.

Once the manifest is distributed in block 712, the process 700 returns to block 702 in which the server continues to receive instrumentation metrics from one or more clients.

Figure 8:
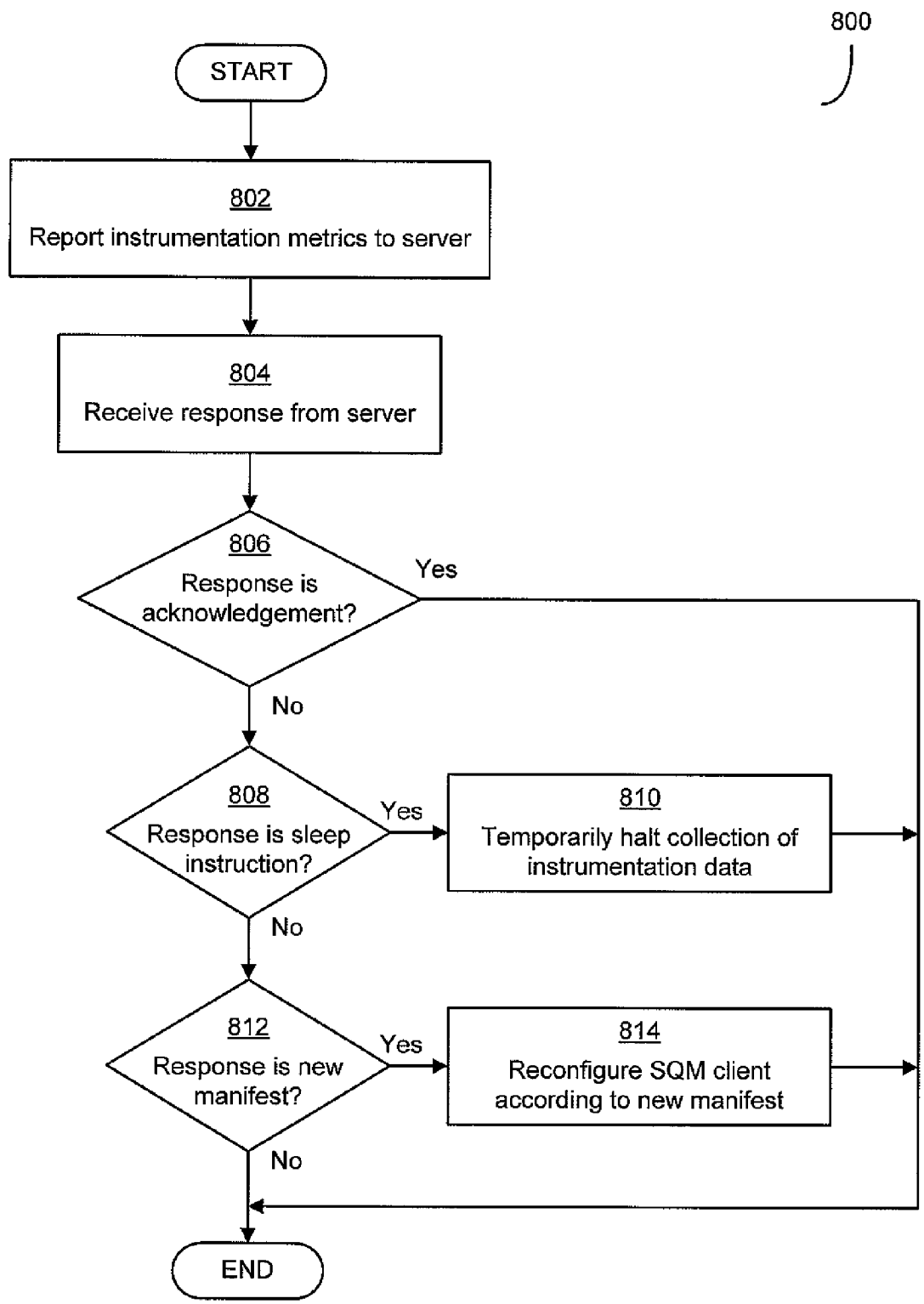
FIG. 8 is a flowchart of one exemplary technique for operating a software quality metrics (SQM) client facility in response to instructions from a SQM server.

FIG. 8 shows an exemplary process 800 that may be implemented in some embodiments of the invention by client computing devices that receive manifests from a server. It should be appreciated that the process 800 is merely exemplary of the types of processes that may be implemented by computing devices to receive manifests from servers and, further, that not all embodiments of the invention may include client computing devices that receive manifests from servers.

Process 800 begins in block 802, in which instrumentation metrics are reported to a server after collection. The initial collection and reporting of metrics may be based on any suitable criteria. For example, the collection and reporting may be based on a previously downloaded manifest or may be based on default metrics included with the software product.

In block 804, the client computing device receives a response from the server that may include any suitable information. Blocks 806, 808, and 812 are decision blocks that are used to evaluate the response and determine how to react to the response.

In block 806, it is determined whether the response is only an acknowledgement of the instrumentation metrics that were transmitted in block 802. If so, then no particular action may need to be taken, and the process 800 ends. In this case, the SQM client may continue collecting instrumentation metrics according to a previous manifest.

In block 808, it is determine whether the response received in block 804 is a sleep instruction that indicates that the SQM client and/or SQM reporting service should not collect or report instrumentation metrics for a period of time. In some cases, the SQM client may be configured in advance to wait for some period of time, such as one week, to collect or report metrics. In other cases, the response may indicate a period of time for which the SQM client should not collect instrumentation metrics. In block 810, the collection of instrumentation metrics is temporarily halted in accordance with the instructions of the response, and the process 800 ends.

In block 812, it is determined whether the response received in block 804 includes or identifies a new manifest to direct the manner in which instrumentation metrics are to be collected. The manifest may, in some embodiments of the invention, be a part of the response, while in other embodiments the manifest may be identified in the response by, for example, a Universal Resource Locator (URL) identifying a location from which the manifest may be retrieved, or in any other manner. In block 814, once the manifest is received, a SQM client and/or SQM reporting service may be configured to collect instrumentation metrics in a manner specified in the new manifest, and the process 800 ends.

The response received in block 804 may be received in any suitable manner, and may be based on the manner in which instrumentation metrics are transmitted in block 802. For example, instrumentation metrics may be transmitted in block 802 according to the HTTP or HTTPS protocol; in this case, the response may be received via the HTTP/HTTPS protocol and may include an appropriate HTTP/HTTPS response code. For example, the response for an acknowledgement may be an HTTP 200, which is an "OK" message. The response for a sleep/suspend instruction may be an HTTP 403, which is a "Forbidden" message. The response for a new manifest may be an HTTP 201, which is a "Created" message. These codes are merely illustrative of the types of response codes that may be included in messages and used to classify responses when a response is received. It should be appreciated that embodiments of the invention are not limited to implementing these or any other specific HTTP codes or any HTTP code at all.

Techniques operating according to the principles described herein may be implemented in any suitable manner. Included in the discussion above are a series of flow charts showing the acts of various processes that collect instrumentation metrics according to the directions of a manifest. The processing and decision blocks of the flow charts above represent steps and acts that may be included in algorithms that carry out these various processes. Algorithms derived from these processes may be implemented as software integrated with and directing the operation of one or more multi-purpose processors, may be implemented as functionally-equivalent circuits such as an Application-Specific Integrated Circuit (ASIC), or may be implemented in any other suitable manner. It should be appreciated that the flow charts included herein do not depict the syntax or operation of any particular circuit or of any particular programming language or type of programming language. Rather, the flow charts illustrate the functional information one of ordinary skill in the art may use to fabricate circuits or to implement computer software algorithms to perform the processing of a particular apparatus carrying out the types of techniques described herein. It should also be appreciated that, unless otherwise indicated herein, the particular sequence of acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, or any other suitable type of software. Such computer-executable instructions may be written using any of a number of suitable programming languages and/or programming or scripting tools, and also may be compiled as executable machine language code or intermediate code that is executed on a framework or virtual machine.

Techniques described herein may be embodied as computer-executable instructions, which may be implemented in any suitable manner, including as a number of functional facilities, each providing one or more operations needed to complete execution of algorithms operating according to these techniques. A "facility," however instantiated, is a structural component of a computer system that, when integrated with and executed by one or more computers, causes the one or more computers to perform a specific operational role. A facility may be a portion of or an entire software element. For example, a facility may be implemented as a function of a process, or as a discrete process, or as any other suitable unit of processing. If techniques described herein are implemented as multiple facilities, each facility may be implemented in its own way; all need not be implemented the same way. Additionally, these facilities may be executed in parallel or serially, as appropriate, and may pass information between one another using a shared memory on the computer(s) on which they are executing, using a message passing protocol, or in any other suitable way.

Generally, facilities include routines, programs, objects, components, data structures, etc. that perform particular tasks or implement particular abstract data types. Typically, the functionality of the facilities may be combined or distributed as desired in the systems in which they operate. In some implementations, one or more functional facilities carrying out techniques herein may together form a complete software package, for example as a software program application such as a Software Quality Metrics (SQM) system. These functional facilities may, in alternative embodiments, be adapted to interact with other, unrelated functional facilities and/or processes, to implement a software program application. In other implementations, the functional facilities may be adapted to interact with other functional facilities in such a way as form an operating system, including the Windows operating system, available from the Microsoft Corporation of Redmond, Wash. In other words, in some implementations, the functional facilities may be implemented alternatively as a portion of or outside of an operating system.

Some exemplary functional facilities have been described herein for carrying out one or more tasks. It should be appreciated, though, that the functional facilities and division of tasks described is merely illustrative of the type of functional facilities that may implement the exemplary techniques described herein, and that the invention is not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable storage media to provide functionality to the storage media. These media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable storage medium may be implemented as computer-readable storage media 906 of FIG. 9 or 1006 of FIG. 10 described below (i.e., as a portion of one of computing devices 900 and 1000) or as a stand-alone, separate storage medium. It should be appreciated that, as used herein, a "computer-readable media," including "computer-readable storage media," refers to tangible storage media having at least one physical property that may be altered in some way during a process of recording data thereon. For example, a magnetization state of a portion of a physical structure of a computer-readable medium may be altered during a recording process.

In some, but not all, implementations in which the techniques may be embodied as computer-executable instructions, these instructions may be executed on one or more suitable computing device(s) operating in any suitable computer system, including the exemplary computer system of FIG. 3. Functional facilities that comprise these computer-executable instructions may be integrated with and direct the operation of a single multi-purpose programmable digital computer apparatus, a coordinated system of two or more multi-purpose computer apparatuses sharing processing power and jointly carrying out the techniques described herein, a single computer apparatus or coordinated system of computer apparatuses (co-located or geographically distributed) dedicated to executing the techniques described herein, one or more Field-Programmable Gate Arrays (FPGAs) for carrying out the techniques described herein, or any other suitable system.

Figure 9:
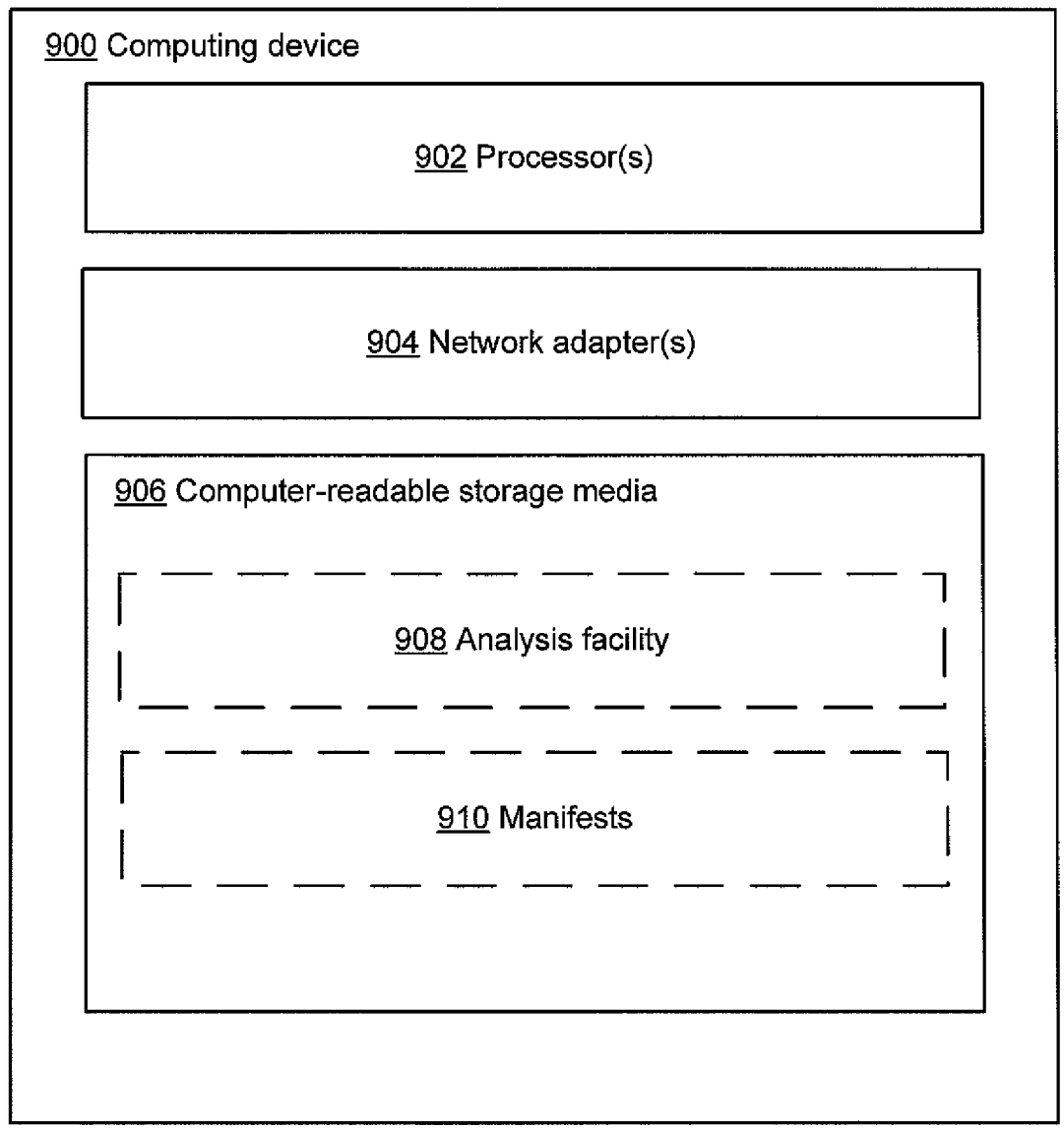
FIG. 9 is a block diagram of one exemplary computing device that may be implemented as a SQM server in some embodiments of the invention.

FIG. 9 illustrates one exemplary implementation of a computing device in the form of a computing device 900 that may be used as a server in a system implementing the techniques described herein, although others are possible. It should be appreciated that FIG. 9 is intended neither to be a depiction of necessary components for a computing device to operate in accordance with the principles described herein, nor a comprehensive depiction.

Computing device 900 may comprise at least one processor 902, a network adapter 904, and computer-readable storage media 906. Computing device 900 may be, for example, a desktop or laptop personal computer, a server, a mainframe, or any other suitable computing device. Network adapter 904 may be any suitable hardware and/or software to enable the computing device 900 to communicate wirelessly with any other suitable computing device over any suitable computing network. The computing network may include a wireless access point as well as any suitable wired and/or wireless communication medium or media for exchanging data between two or more computers, including the Internet. Computer-readable media 906 may be adapted to store data to be processed and/or instructions to be executed by processor 902. Processor 902 enables processing of data and execution of instructions. The data and instructions may be stored on the computer-readable storage media 906 and may, for example, enable communication between components of the computing device 900.

The data and instructions stored on computer-readable storage media 906 may comprise computer-executable instructions implementing techniques which operate according to the principles described herein. In the example of FIG. 9, computer-readable storage media 906 stores computer-executable instructions implementing various facilities and storing various information as described above. Computer-readable storage media 906 may store an analysis facility 908 to process and analyze instrumentation metrics that are received from one or more client computers. The analysis facility 908 may automatically process the instrumentation metrics and/or may present the metrics to one or more users for review via any suitable user interface. Computer-readable storage media 906 may further store manifests 908, which may be a set of one or more manifests that may be transmitted to client computers to direct the manner in which instrumentation metrics are collected at those client computers. In some embodiments of the invention, the analysis facility 906 may be adapted to distribute the manifests 908 to the client computers by, for example, determining which client computers should receive which manifest.

Figure 10:
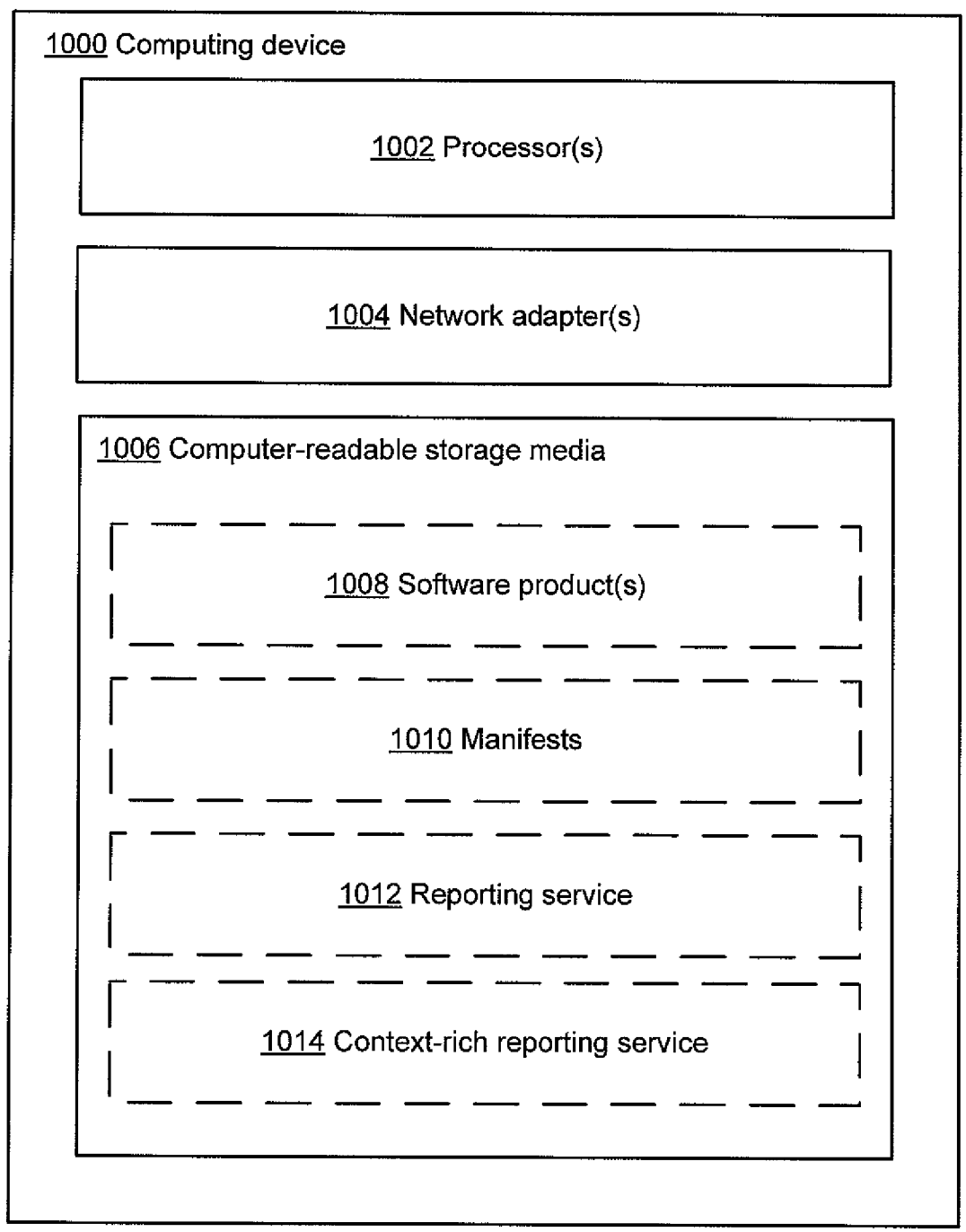
FIG. 10 is a block diagram of one exemplary computing device that executes a SQM client in some embodiments of the invention.

FIG. 10 illustrates one exemplary implementation of a computing device in the form of a computing device 1000 that may be used as a client computing device in a system implementing the techniques described herein, although others are possible. It should be appreciated that FIG. 10 is intended neither to be a depiction of necessary components for a computing device to operate in accordance with the principles described herein, nor a comprehensive depiction.

Computing device 1000 may comprise at least one processor 1002, a network adapter 1004, and computer-readable storage media 1006. Computing device 1000 may be, for example, a desktop or laptop personal computer, a personal digital assistant (PDA), a smart mobile phone, a server, a wireless access point or other networking element, or any other suitable computing device. Network adapter 1004 may be any suitable hardware and/or software to enable the computing device 1000 to communicate wirelessly with any other suitable computing device over any suitable computing network. The computing network may include a wireless access point as well as any suitable wired and/or wireless communication medium or media for exchanging data between two or more computers, including the Internet. Computer-readable media 1006 may be adapted to store data to be processed and/or instructions to be executed by processor 1002. Processor 1002 enables processing of data and execution of instructions. The data and instructions may be stored on the computer-readable storage media 1006 and may, for example, enable communication between components of the computing device 1000.

The data and instructions stored on computer-readable storage media 1006 may comprise computer-executable instructions implementing techniques which operate according to the principles described herein. In the example of FIG. 10, computer-readable storage media 1006 stores computer-executable instructions implementing various facilities and storing various information as described above. Computer-readable storage media 1006 may store one or more software products 1008, each of which may include a SQM client to collect instrumentation metrics in a particular manner according to a manifest. Computer-readable storage media 1006 may also store manifests 1010, which may include one or more manifests for each software product 1006. A reporting service 1012 for receiving and transmitting instrumentation metrics collected by a SQM client of a software product 1008 may also be stored on the computer-readable storage media 1006. Lastly, as shown in FIG. 10, the computer-readable storage media may include a context-rich reporting service 1014. Each of these facilities stored on computer-readable storage media 1006 may operate in any suitable way to implement principles described herein, including any of the exemplary techniques described above or any other suitable technique.

While not illustrated in FIGS. 9 and 10, a computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments of the invention have been described where the techniques are implemented in circuitry and/or computer-executable instructions. It should be appreciated that the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method of collecting information on a software product that is executed on a computing device, the information relating to a manner of execution of the software product on the computing device, the method comprising:
   receiving, at the computing device, a manifest containing instructions on collecting and reporting instrumentation metrics regarding operation of the software product, the manifest comprising first information specifying at least a first instrumentation metric to be collected, second information identifying at least one escalation condition to be evaluated by the computing device and third information identifying a manner by which the first instrumentation metric is to be collected;
   collecting for the software product, based on the manifest, the first instrumentation metric specified in the manifest;
   evaluating, on the computing device and based on the manifest, the at least one escalation condition and, only when the at least one escalation condition is satisfied, performing an escalation action, wherein the escalation action includes collecting a second instrumentation metric;
   transmitting, from the computing device, the first instrumentation metric and, when the second instrumentation metric was collected, the second instrumentation metric;
   receiving, at the computing device, a response to the transmission of the first metric including a second manifest;
   upon receiving the response, determining that the second manifest specifies at least timing information including a sleep instruction and a third instrumentation metric to be collected, wherein the timing information specifies in advance a particular period of time when the computing device is to temporarily stop collecting instrumentation data and the third instrumentation metric is different from the first instrumentation metric and the second instrumentation metric;
   wherein the sleep instruction causes the computing device to temporarily stop collecting instrumentation metrics for the particular period of time; and
   in response to the determining, after the particular period of time, collecting the third instrumentation metric.

2. The method of claim 1, wherein collecting the first instrumentation metric comprises:
   retrieving instrumentation data on the software product; and
   generating the first instrumentation metric based on the instrumentation data.

3. The method of claim 2, wherein retrieving the instrumentation data comprises retrieving the instrumentation data from a log file populated by the software product.

4. The method of claim 2, wherein retrieving the instrumentation data comprises retrieving the instrumentation data from the software product while the software product is executing.

5. The method of claim 1, wherein the manifest identifies a manner in which the first instrumentation metric collected in the collecting is to be collected.

6. The method of claim 5, wherein the manifest identifies at least one instrumentation datum regarding the software product and a computation to be performed on the at least one instrumentation datum to generate the first instrumentation metric.

7. The method of claim 1, wherein evaluating the at least one escalation condition comprises determining whether an escalation condition is satisfied by comparing at least one information value to a threshold.

8. The method of claim 7, wherein the at least one information value is a value of an instrumentation metric.

9. The method of claim 1, wherein the third instrumentation metric is unrelated to the software product.

10. The method of claim 1, wherein the manifest specifies additional timing information for reporting the first instrumentation metric and the second instrumentation metric.

11. At least one computer-readable storage medium encoded with computer-executable instructions that, when executed by a computer, carry out a method collecting information on a software product that is executed on a computing device, the information relating to a manner of execution of the software product on the computing device, the method comprising:

receiving, at the computing device, a manifest containing instructions on calculating instrumentation metrics regarding the operation of the software product, the manifest comprising first information identifying a manner by which the instrumentation metrics are to be collected;

selecting, based on the manifest, at least one instrumentation datum;

retrieving, from a log file populated by the software product, the selected at least one instrumentation datum;

performing at least one computation on the retrieved at least one instrumentation datum, the at least one computation being specified by the manifest, to generate a first instrumentation metric; and transmitting the first instrumentation metric from the computing device;

receiving a response to the transmitting of the first instrumentation metric;

upon receiving the response, determining that the response includes a new manifest specifying timing information including a sleep instruction and at least one second computation to collect a second instrumentation metric, wherein the timing information specifies in advance a particular period of time when the computing device is to temporarily stop collecting instrumentation data and the at least one second computation is different from the at least one computation specified by the manifest;

wherein the sleep instruction causes the computing device to temporarily stop collecting instrumentation metrics for the particular period of time; and based on the determining, after the particular period of time, performing the at least one second computation specified by the new manifest to generate the second instrumentation metric, wherein the second instrumentation metric is unrelated to the software product.

12. The at least one computer-readable storage medium of claim 11, wherein performing the at least one computation comprises performing at least one computation involving the at least one instrumentation datum retrieved from the log file.

13. The at least one computer-readable storage medium of claim 11, wherein:

receiving the manifest comprises receiving first information identifying at least one escalation condition to be evaluated by the computing device and second information specifying at least one further instrumentation metric to be collected when the at least one escalation condition is satisfied, and the method further comprises:
evaluating, by the computing device, the at least one escalation condition,
when the at least one escalation condition is satisfied, performing at least one escalation action, wherein the escalation action includes collecting the at least one further instrumentation metric specified by the second information of the manifest, and
transmitting the at least one further instrumentation metric from the computing device.

14. The at least one computer-readable storage medium of claim 13, wherein the second information of the manifest specifies that the at least one further instrumentation metric comprises context-rich data regarding an environment in which the software product is executing.

15. The at least one computer-readable storage medium of claim 11, wherein the manifest specifies additional timing information for reporting the first instrumentation metric and the second instrumentation metric.

16. At least one computing device adapted as a server and adapted to interact with one or more clients to collect information on a status of software products in use on the one or more clients, the at least one computing device comprising:

at least one processor adapted to:
receive reported instrumentation metrics from a client computing device regarding a software product; and
when it is determined that the reported instrumentation metrics meet at least one condition,
categorize the client computing device into a test group of at least two test groups, each of the at least two groups corresponding to a manifest for the test group, each manifest instructing a collection of instrumentation metrics in a particular manner and identifying at least one instrumentation metric to be collected,
transmit to the client computing device the manifest instructing the client computing device to collect the instrumentation metrics in the particular manner that corresponds to the test group into which the client computing device was categorized.

17. The at least one computing device of claim 16, wherein the reported instrumentation data comprises at least one performance characteristic for the software product, and wherein the at least one processor is further adapted to:
if it is determined that the performance characteristic indicates a potential problem with the software product, transmit a particular manifest to the client computing device that will cause the client computing device to collect new instrumentation data that will aid in diagnosis of the potential problem, wherein the particular manifest specifies at least one different performance characteristic to be included in the new instrumentation data.

18. The at least one computing device of claim 16, wherein the at least one processor is adapted to categorize the client computing device into the test group at least by:

determining whether the reported instrumentation data for the client computing device meets the at least one condition by comparing identification data for the client computing device, contained within the reported instrumentation data, to a definition of the test group to determine whether the client computing device falls within the test group.

19. The at least one computing device of claim 16, wherein the at least one processor is further adapted to:

receive second reported instrumentation metrics from a second client computing device; and
transmit to the second client computing device an instruction to collect instrumentation metrics in a second particular manner different from the particular manner.

20. The at least one computing device of claim 16, wherein the at least one processor is further adapted to:

receive at least a portion of the reported instrumentation data via a second server, the second server receiving context-rich instrumentation data from the client computing device via a context-rich reporting service.

* * * * *